US008827398B2

(12) United States Patent
Oba et al.

(10) Patent No.: US 8,827,398 B2
(45) Date of Patent: Sep. 9, 2014

(54) IMAGE RECORDING DEVICE, IMAGE RECORDING METHOD

(71) Applicant: Seiko Epson Corporation, Tokyo (JP)

(72) Inventors: Masashi Oba, Nagano (JP); Yujiro Nomura, Nagano (JP); Kaneo Yoda, Nagano (JP)

(73) Assignee: Seiko Epson Corporation, Tokyo (JP)

(*) Notice: Subject to any disclaimer, the term of this patent is extended or adjusted under 35 U.S.C. 154(b) by 15 days.

(21) Appl. No.: 13/683,354

(22) Filed: Nov. 21, 2012

(65) Prior Publication Data

US 2013/0135370 A1 May 30, 2013

(30) Foreign Application Priority Data

Nov. 24, 2011 (JP) ................................ 2011-255792

(51) Int. Cl.

| | |
|---|---|
| ***B41J 15/16*** | (2006.01) |
| ***G01D 15/24*** | (2006.01) |
| ***B41J 2/135*** | (2006.01) |
| ***B41J 25/308*** | (2006.01) |

(52) U.S. Cl.
CPC ................ *B41J 2/135* (2013.01); *B41J 15/165* (2013.01); *B41J 25/308* (2013.01)
USPC ............................................... 347/9; 347/219

(58) Field of Classification Search
CPC .... B41J 15/16; B65H 23/1888; G03G 15/652
USPC ............................................................ 347/9
See application file for complete search history.

(56) References Cited

U.S. PATENT DOCUMENTS

| | | | | |
|---|---|---|---|---|
| 6,741,830 | B2 | 5/2004 | Kinoshita et al. | |
| 2002/0018084 | A1* | 2/2002 | Shiida et al. | 347/8 |
| 2008/0031655 | A1* | 2/2008 | Kondo | 399/123 |
| 2011/0149003 | A1* | 6/2011 | Kondo | 347/104 |

FOREIGN PATENT DOCUMENTS

| | | | |
|---|---|---|---|
| JP | 10-086472 | A | 4/1998 |
| JP | 4328043 | B2 | 9/2009 |

* cited by examiner

*Primary Examiner* — Stephen Meier
*Assistant Examiner* — Alexander D Shenderov
(74) *Attorney, Agent, or Firm* — Global IP Counselors, LLP

(57) ABSTRACT

An image recording device includes: a support member for supporting a sheet-shaped print medium; a print head that moves between a print position, at which printing of an image onto the print medium is executed, and a retracted position, farther away from the support member than the print position, while also facing the support member, with the print medium interposed therebetween; a tension adjustment unit for adjusting the tension of the print medium being supported by the support member; and a control unit whereby printing is executed by the print head having been positioned at the print position while the tension of the print medium is adjusted to a print tension by the tension adjustment unit, whereas the print head is positioned at the retracted position when the tension of the print medium is being altered by the tension adjustment unit.

11 Claims, 8 Drawing Sheets

IMAGE RECORDING DEVICE, IMAGE RECORDING METHOD

CROSS-REFERENCE TO RELATED APPLICATIONS

This application claims priority to Japanese Patent Application No. 2011-255792 filed on Nov. 24, 2011. The entire disclosure of Japanese Patent Application No. 2011-255792 is hereby incorporated herein by reference.

BACKGROUND

1. Technical Field

The present invention relates to a technology for printing an image onto a print medium by using a print head that faces a support member for supporting the print medium, with the print medium being interposed between the support member and the print head.

2. Background Technology

Patent Document 1 describes an image recording device in which a print medium (a continuous sheet of paper) being conveyed from a paper conveyor unit to a paper puller unit is wound around and supported by a support member (conveyance drum) arranged between the paper conveyor unit and the paper puller unit. According to this image recording device, an imprinting head (print unit) that faces the support member, with the print medium interposed between the support member and the imprinting head, prints an image onto the continuous sheet of paper being supported by the support member. In an image recording device of such description, as is stated in Patent Document 2, it is also possible to execute, when appropriate, an operation in which the tension of the print medium is adjusted.

Japanese Laid-open Patent Publication No. 10-086472 (Patent Document 1) and Japanese Patent No. 4328043 (Patent Document 2) are examples of the related art.

SUMMARY

Problems to be Solved by the Invention

It has been noted that in an image recording device in which printing is carried out by a print head that faces a support member with a print medium interposed between the support member and the print head, the gap between the print medium and the print head has an influence on the print precision. In view whereof, preferably, printing is carried out in a state where the print head has been brought into close proximity with the print medium, in order to ensure high print precision. However, in the configuration of such description, problems have emerged whenever the tension of the print medium is altered. The reason therefor is believed to be that the print medium floats upward away from the support member in association with the alteration in tension and comes into contact with the print head, which is in close proximity thereto, and the print medium is thereby sullied or the print head is thereby damaged.

It is therefore an advantage of the present invention, which has been contrived in view of the foregoing problems, to provide a technology for making it possible to suppress the occurrence of contact between a print head and a print medium, which floats upward in association with an alteration in tension, while also making it possible to implement printing in a state where the print head has been brought into close proximity to the print medium.

Means Used to Solve the Above-Mentioned Problems

In order to achieve the foregoing advantage, the image recording device including: a support member for supporting a sheet-shaped print medium; a print head that moves between a print position, at which printing of an image onto the print medium is executed, and a retracted position, which is farther away from the support member than the print position, while also facing the support member, with the print medium interposed therebetween; a tension adjustment unit for adjusting the tension of the print medium being supported by the support member; and a control unit whereby printing is executed by the print head having been positioned at the print position while the tension of the print medium is adjusted to a print tension by the tension adjustment unit, whereas the print head is positioned at the retracted position when the tension of the print medium is being altered by the tension adjustment unit.

In order to achieve the foregoing advantage, the image recording method including: a print step for orienting a print head having been positioned at a print position, so as to face a support member, with a sheet-shaped print medium supported by the support member being interposed therebetween, and then causing the print head to execute printing of an image onto the print medium; and a tension alteration step for altering the tension of the print medium, either before or after the print step, in a state where the print head has been positioned at a retracted position farther away from the support member than the print position.

In the invention configured in this fashion (the image recording device and the image recording method), the print head having been positioned at the print position executes printing onto the print medium while also facing the support member, with the print medium interposed therebetween. The print head can be positioned at the print position for executing printing as well as at the retracted position farther away from the support member than the print position. Thus, the print head is positioned at the retracted position whenever the tension of the print medium is to be changed. Namely, in the present invention, when printing is to be executed, then the print head is positioned at the print position, which is in comparatively greater proximity to the support member, and thus the print head is in close proximity to the print medium, whereas when the tension of the print medium is to be altered, then the print head is positioned at the retracted position, which is comparatively farther away from the support member, and thus the print head is separated away from the print medium. In this manner, printing in a state where the print head has been brought into close proximity to the print medium can be implemented, and also contact between the print head and the recording medium, which floats upward in association with the alteration of the tension, can be suppressed.

More specifically, the image recording device can be configured such that the control unit elevates the tension of the print medium to the print tension in the state where the print head has been positioned at the retracted position, and thereafter moves the print head to the print position to execute printing. In the configuration of such description, the tension of the print medium can be elevated to the print tension while contact between the print medium and the print head is suppressed, and also subsequent printing can be executed appropriately in a state where the print head has been brought into close proximity with the print medium.

Alternatively, the image recording device can be configured such that when the printing by the print head is concluded, the control unit moves the print head to the retracted position and thereafter reduces the tension of the print medium from the print tension. In the configuration of such description, printing can be executed appropriately in the state where the print head has been brought into close proximity to the print medium, and also the subsequent reduction of the tension of the print medium can be implemented while contact between the print medium and the print head is suppressed.

It should also be noted that the image recording device can be configured so as to further include a conveyor unit for conveying the print medium, wherein the control unit executes the printing on the print medium being conveyed by the conveyor unit. However, with the configuration of such description, in a case where the conveyor unit has changed the conveyance speed of the print medium, the print medium can presumably float up away from the support member, in association with the change in speed, and then come into contact with the print head which is in close proximity thereto, and the print medium can be thereby sullied or the print head can be thereby damaged.

In view whereof, the image recording device can be configured such that the control unit positions the print head at the retracted position whenever the conveyor unit is to change the conveyance speed of the print medium. In the configuration of such description, the conveyance speed of the print medium can be changed while contact between the print medium and the print head is suppressed.

The fact that the tension of the print medium fluctuates when the conveyance speed of the print medium is in some cases a cause for the upward floating of the print medium. In view whereof, the image recording device can be configured so as to further include a tension detection unit for detecting the tension of the print medium, wherein the control unit confirms, by a detection result from the tension detection unit, that the tension of the print medium after the conveyance speed has been changed has stabilized, and thereafter moves the print head to the print position to execute printing. In the configuration of such description, the conveyance speed of the print medium can be changed while contact between the print medium and the print head is suppressed, and also the subsequent printing can be appropriately executed in the state where the print head has been brought into close proximity to the print medium.

Also, the fact that the conveyance speed of the print medium is temporarily unstable after the conveyance speed of the print medium has been changed is in some cases a cause for the upward floating of the print medium. In view whereof, the image recording device can be configured such that the control unit positions the print head at the retracted position while the conveyance speed is being changed, and also moves the print head to the print position to execute printing once the conveyance speed of the print medium, after the conveyance speed has been changed, has stabilized. In the configuration of such description, the print medium can be accelerated to a predetermined conveyance speed while contact between the print medium and the print head is suppressed, and also the subsequent printing can be appropriately executed in the state where the print head has been brought into close proximity to the print medium.

It should also be noted that the image recording device can be configured such that the support member is a cylindrical-shaped support drum for supporting the print medium while the print medium is wound therearound, and rotates while being driven by the print medium being conveyed by the conveyor unit. In comparison to a configuration in which the print medium is supported on a flat surface, the configuration of such description in which the print medium is wound around and supported by the cylindrical support drum is advantageous in that the support member can be closely contacted with the print medium and upward floating of the print medium can be minimized, and also in that the occurrence of contact between the print medium and the print head can suppressed.

Herein, the image recording device can be configured so as to further include a rotation detection unit for detecting the rotation of the support drum, wherein the control unit confirms, by a detection result from the rotation detection unit, that the conveyance speed of the print medium has stabilized, and thereafter moves the print head to the print position to execute printing. With the configuration of such description, the occurrence of contact between the print medium and the print head can be even more reliably suppressed.

Also, the image recording device can be configured such that when the printing by the print head is concluded, the control unit moves the print head to the retracted position, and thereafter causes the conveyor unit to reduce the conveyance speed of the print medium. In the configuration of such description, printing can be executed appropriately in the state where the print head has been brought into close proximity to the print medium, and also the subsequent reduction of the conveyance speed of the print medium can be implemented while contact between the print medium and the print head is suppressed.

BRIEF DESCRIPTION OF THE DRAWINGS

Referring now to the attached drawings which form a part of this original disclosure.

DETAILED DESCRIPTION OF EXEMPLARY EMBODIMENTS

First Embodiment

Figure 1:
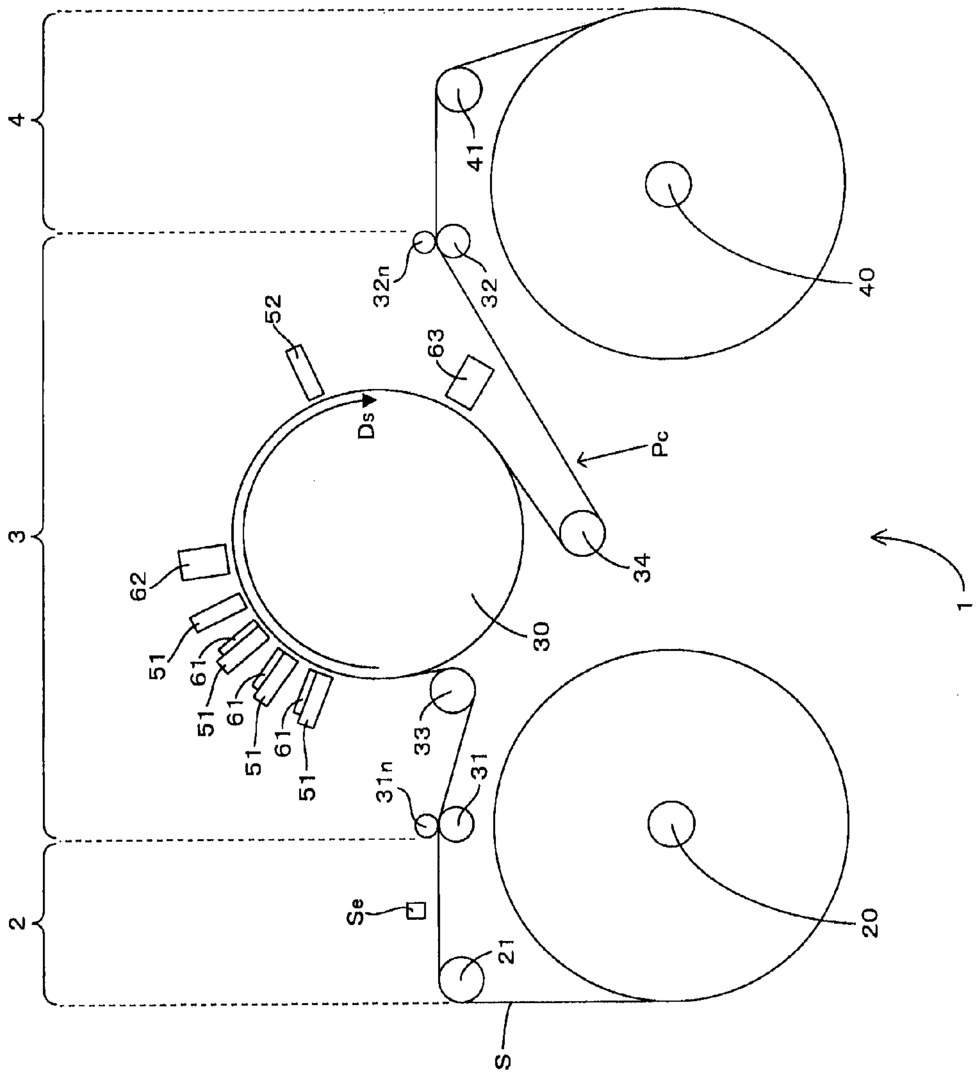
FIG. 1 is a drawing schematically illustrating an example of a device configuration provided to a printer to which the invention can be applied.

FIG. 1 is a plan view schematically illustrating an example of a configuration of a device configuration provided to a printer to which the invention can be applied. As illustrated in FIG. 1, in a printer 1, a single sheet S (web) having two ends that have been wound in a roll-shaped fashion around a supply spindle 20 and a take-up spindle 40 is stretched between the supply spindle 20 and the take-up spindle 40, and the sheet S is conveyed from the supply spindle 20 to the take-up spindle 40 along a pathway Pc having been thus stretched. In the printer 1, an image is recorded onto the sheet S being conveyed along the conveyance pathway Pc. The type of sheet S is largely divided into paper-based and film-based. As specific examples, paper-based includes high-quality paper, cast paper, art paper, coated paper, and the like, while film-based includes synthetic paper, PET (Polyethylene terephthalate), PP (polypropylene), and the like. In brief, the printer 1 is provided with: a supply unit 2 for supplying the sheet S from the supply spindle 20; a process unit 3 for recording an image onto the sheet S having been supplied from the supply unit 2; and a take-up unit 4 for taking up, around the take-up spindle 40, the sheet S on which the image has been recorded by the process unit 3. In the following description, whichever side of the two sides of the sheet S is the one on which the image is recorded is referred to as the "front surface", while the side opposite thereto is referred to as the "back surface".

The supply unit 2 has the supply spindle 20, around which an end of the sheet S has been wound, as well as a driven roller 21 around which is wound the sheet S having been drawn out from the supply spindle 20. The supply unit 20 supports the end of the sheet S wound therearound in a state where the front surface of the sheet S faces outward. When the supply spindle 20 is rotated in the clockwise direction in FIG. 1, the sheet S having been wound around the supply spindle 20 is thereby made to pass via the driven roller 21 and supplied to the process unit 3. It should also be noted that the sheet S is wound about the supply spindle 20 with a core tube (not shown) therebetween, the core tube being detachable with respect to the supply spindle 20. As such, when the sheet S of the supply spindle 20 has been exhausted, it is possible for a new core tube around which a roll of the sheet S has been wound to be mounted onto the supply spindle 20, to replace the sheet S of the supply spindle 20.

The process unit 3 is intended to record an image onto the sheet S by carrying out a process, as appropriate, using functional units 51, 52, 61, 62, 63 arranged along the outer peripheral surface of a platen drum 30 while the platen drum 30 supports the sheet S having been supplied from the supply unit 2. In the process unit 3, a front drive roller 31 and a rear drive roller 32 are provided on two ends of the platen drum 30, and the sheet S, which is conveyed from the front drive roller 31 to the rear drive roller 32, is supported on the platen drum 30 and undergoes image recording.

The front drive roller 31 has on the outer peripheral surface a plurality of minute projections formed by thermal spraying, and the sheet S having been supplied from the supply unit 2 is wound around from the back surface side. When the front drive roller 31 is rotated in the clockwise direction in FIG. 1, the sheet S having been supplied from the supply unit 2 is thereby conveyed downstream on the conveyance path. A nip roller 31*n* is provided to the front drive roller 31. The nip roller 31*n* is urged toward the front drive roller 31 side and in this state abuts against the front surface of the sheet S, and sandwiches the sheet S with the front drive roller 31 on the other side. This ensures the force of friction between the front drive roller 31 and the sheet S, and makes it possible for the front drive roller 31 to reliably convey the sheet S.

The platen drum 30 is a cylindrically-shaped drum rotatably supported by a support mechanism (not shown), and the sheet S being conveyed from the front drive roller 31 to the rear drive roller 32 is wound therearound from the back surface side. The platen drum 30 is intended to support the sheet S from the back surface side while also reciprocatingly rotating in a conveyance direction Ds of the sheet S, under the force of friction against the sheet S. It should also be noted that in the process unit 3, driven rollers 33, 34 for folding the sheet S on both sides of a section wound around the platen drum 30 are provided. Of these, the driven roller 33 folds the sheet S with the front surface of the sheet S wound between the front drive roller 31 and the platen drum 30. On the other hand, the driven roller 34 folds the sheet S with the front surface of the sheet S wound between the platen drum 30 and the rear drive roller 32. In this manner, the sheet S is folded upstream and downstream of the platen drum 30 in the conveyance direction Ds, whereby the length of the wound section of the sheet S on the platen drum 30 can be ensured.

The rear drive roller 32 has on the outer peripheral surface a plurality of minute projections formed by thermal spraying, and the sheet S having been conveyed from the platen drum 3 via the driven roller 34 is wound therearound from the back surface side. When the rear drive roller 32 is rotated in the clockwise direction in FIG. 1, the sheet S is thereby conveyed toward the take-up unit 4. A nip roller 32*n* is provided to the rear drive roller 32. This nip roller 32 is urged toward the rear drive roller 32 and in this state abuts against the front surface of the sheet S, and sandwiches the sheet S with the rear drive roller 32 on the other side. This ensures the force of friction between the rear drive roller 32 and the sheet S, and makes it possible for the rear drive roller 32 to reliably convey the sheet S.

In this manner, the sheet S being conveyed from the front drive roller 31 to the rear drive roller 32 is supported on the outer peripheral surface of the platen drum 30. Also, with the process unit 3, in order to record a color image onto the front surface of the sheet S being supported on the platen drum 30, a plurality of recording heads 51 corresponding to mutually different colors are provided. Specifically, four recording heads 51 corresponding to yellow, cyan, magenta, and black are lined up in the stated order of colors in the conveyance direction Ds. Each of the recording heads 51 faces the front surface of the sheet S wound around the platen drum 30, with a certain amount of clearance therebetween, and ejects ink of the corresponding color in an ink jet scheme. When each of the recording heads 51 ejects ink onto the sheet S being conveyed toward the conveyance direction Ds, a color image is thereby formed on the front surface of the sheet S.

It should be noted that the ink used is a UV (ultraviolet) ink that is cured by being irradiated with ultraviolet rays (light) (i.e., is a photo-curable ink). In view whereof, with the process unit 3, in order to cure the ink and affix same to the sheet S, UV lamps 61, 62 (light irradiation units) are provided. The execution of this curing of the ink is divided into two stages, which are temporary curing and true curing. A UV lamp 61 for temporary curing is arranged between each of the plurality of recording heads 51. Namely, the UV lamp 61 is intended to irradiate with weak ultraviolet rays and thereby cure the ink to such an extent that the shape of the ink is not lost (temporary curing), and is not intended to fully cure the ink. On the other hand, a UV lamp 62 for true curing is provided downstream in the conveyance direction Ds with respect to each of the plurality of recording heads 51. Namely, the UV lamp 62 irradiates with stronger ultraviolet rays than the UV lamp 61 and is intended to thereby fully cure the ink (true curing). Executing the temporary curing and true curing in this manner makes it possible to affix onto the front surface of the sheet S the color image formed by the plurality of recording heads 51.

Also, a recording head 52 is provided downstream in the conveyance direction Ds with respect to the UV lamp 62. This recording head 52 faces the front surface of the sheet S wound around the platen drum 30, with a certain amount of clearance therebetween, and ejects a transparent UV ink onto the front surface of the sheet S in an ink jet scheme. In other words, the transparent ink is additionally ejected onto the color image formed by the recording heads 51 of the four different colors. A UV lamp 63 is also provided downstream in the conveyance direction Ds with respect to the recording head 52. This UV lamp 63 irradiates with strong ultraviolet rays and is intended to thereby fully cure (true curing) the transparent ink having been ejected by the recording head 52. This makes it possible to affix the transparent ink onto the front surface of the sheet S.

With the process unit 3, this manner of ejecting and curing ink is executed as appropriate on the sheet S wound about the outer peripheral part of the platen drum 30, and a color image coated with the transparent ink is formed. Also, the sheet S on which the color image has been formed is conveyed toward the take-up unit 4 by the rear drive roller 32.

As per the foregoing description, in the process unit 3, the recording heads 51 of the four different colors and the recording head 52 for transparent ink each respectively face the outer peripheral surface of the platen drum 30 with the sheet S interposed therebetween. Each of the recording heads 51, 52 can be positioned at a print position (the position in FIG. 1) at which ink is ejected onto the sheet S and printing is carried out, as well as at a retracted position farther away from the outer peripheral surface of the platen drum 30 than the print position. This topic shall now be described in greater detail, with reference to FIG. 2.

Figure 2:
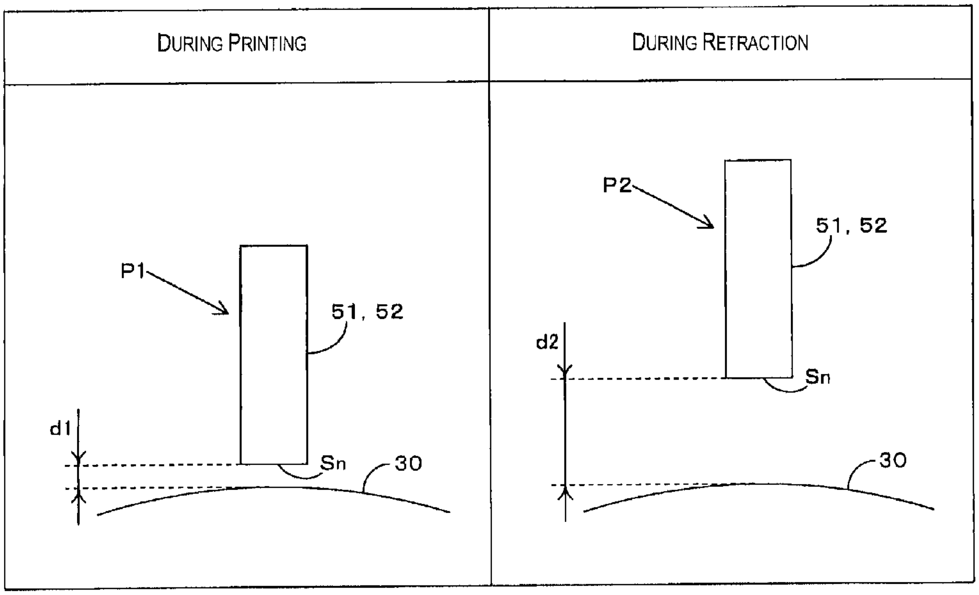
FIG. 2 is a drawing illustrating examples of a print position and a retracted position that can be adopted by a recording head.

FIG. 2 is a drawing illustrating examples of the print position and the retracted position that can be adopted by the recording heads. In FIG. 2, the box marked "DURING PRINTING" illustrates the position of the recording heads 51, 52 during printing, and the box marked "DURING RETRACTION" illustrates the position of the recording heads 51, 52 during retraction. When printing is to be carried out on the sheet S, as is illustrated by the box marked "DURING PRINTING" in FIG. 2, each of the recording heads 51, 52 is positioned at a print position P1; the gap between a nozzle opening surface Sn (a surface where a nozzle for ejecting the ink is opened) of each of the recording heads 51, 52 and the outer peripheral surface of the platen drum 30, which faces same, will be a distance d1 (=0.7 mm). Each of the recording heads 51, 52 ejects ink from the nozzle at the print position P1 to print an image onto the sheet S.

On the other hand, as is illustrated by the box marked "DURING RETRACTION" in FIG. 2, each of the recording heads 51, 52 can also be positioned at a retracted position P2 that is separated from the print position P1 in the radial direction of the platen drum 30. When at the retracted position P2, the gap between the nozzle opening surface Sn of each of the recording heads 51, 52 and the outer peripheral surface of the platen drum 30, which faces same, will be a distance d2 (=5 mm>d1). In other words, each of the recording heads 51, 52 can be positioned at the print position P1, as well as at the retracted position P2 farther away from the outer peripheral surface of the platen drum 30 than the print position P1.

The description shall now continue, again referring to FIG. 1. In addition to the take-up spindle 40 around which an end of the sheet S is wound, the take-up unit 4 also has a driven roller 41 around which the sheet S is wound from the back surface side between the take-up spindle 40 and the rear drive roller 32. The take-up spindle 40 supports one end of the sheet S taken up therearound in a state where the front surface of the sheet S is facing outward. Namely, when the take-up spindle 40 is rotated in the clockwise direction in FIG. 1, the sheet S, which has been conveyed from the rear drive roller 32, passes through the driven roller 41 and is taken up around the take-up spindle 40. It also should be noted that the sheet S is taken up around the take-up spindle 40 with a core tube (not shown) therebetween, the core tube being detachable with respect to the take-up spindle 40. As such, when the sheet S taken up around the take-up spindle 40 is fully stocked, it becomes possible to remove the sheet S in an amount commensurate with the core tube.

Figure 3:
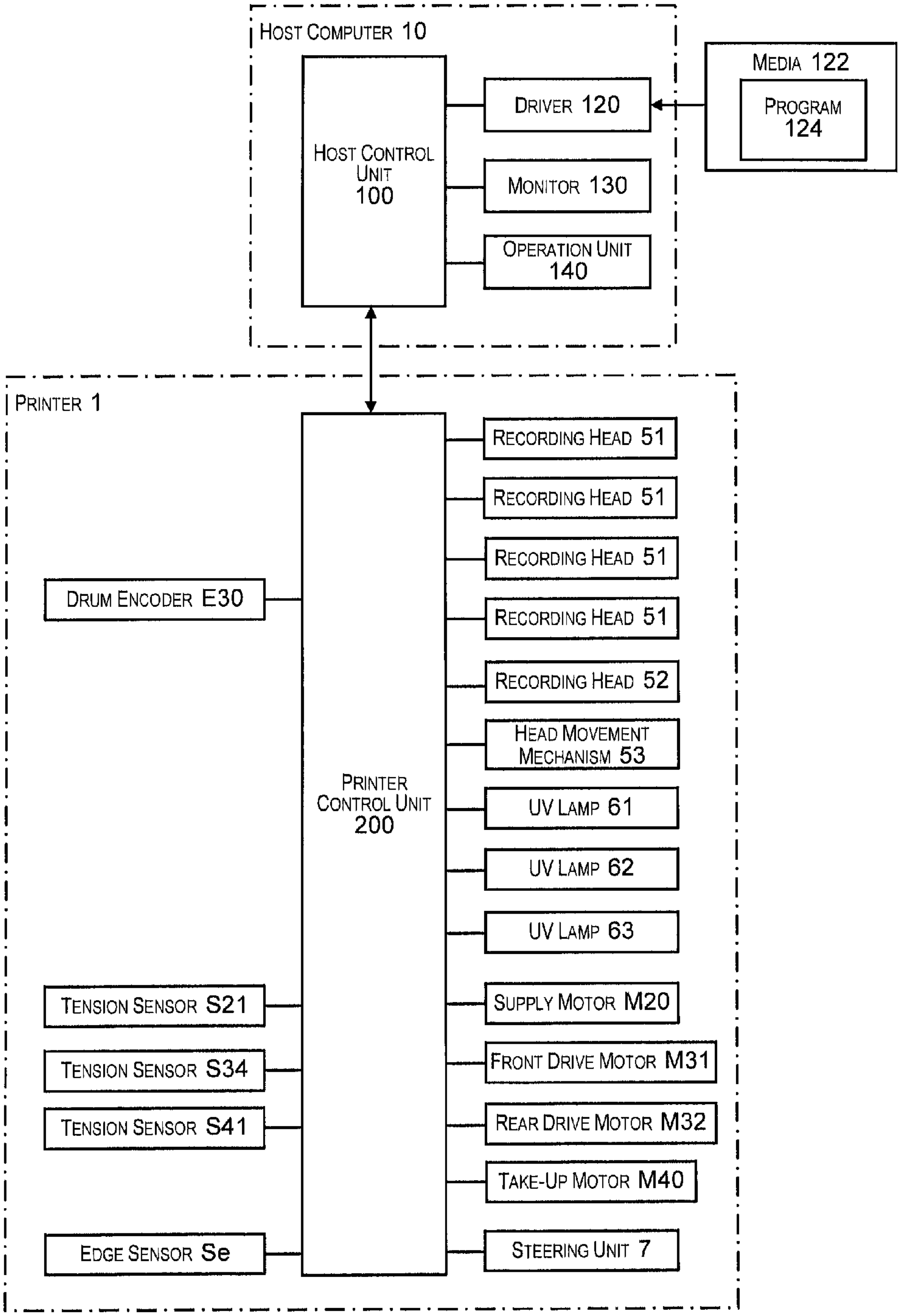
FIG. 3 is a drawing schematically illustrating an electrical configuration for controlling the printer illustrated in FIG. 1.

The foregoing is a summary of the device configuration of the printer 1. The following description shall relate to the electrical configuration for controlling the printer 1. FIG. 3 is a block diagram schematically illustrating the electrical configuration for controlling the printer illustrated in FIG. 1. The operation of the printer 1 described above is controlled by a host computer 10 illustrated in FIG. 3. With the host computer 10, a host control unit 100 for governing all control operations is constituted of a CPU (Central Processing Unit) and a memory. A driver 120 is also provided to the host computer 10, and this driver 120 reads out a program 124 from media 122. The media 122 can be a variety of different things, such as a CD (Compact Disk), DVD (Digital Versatile Disk), or USB (Universal Serial Bus) memory. The host control unit 100 also controls each of the parts of the host computer 10 and controls the operation of the printer 1, on the basis of the program 124 having been read out from the media 122.

A monitor 130 constituted of a liquid crystal display or the like and an operation unit 140 constituted of a keyboard, mouse, or the like are provided to the host computer 10 as interfaces for interfacing with an operator. In addition to an image to be printed, a menu screen is also displayed on the monitor 130. As such, by operating the operation unit 140 while also checking the monitor 130, the operator is able to open up a print setting screen from the menu screen and set the type of printing medium, the size of printing medium, the quality of printing, and a variety of other print conditions. A variety of modifications could be made to the specific configuration of the interface for interfacing with the operator; for example, a touch panel-type display can be used as the monitor 130, the operation unit 140 being then constituted of the touch panel of this monitor 130.

On the other hand, in the printer 1, a printer control unit 200 for controlling each of the parts of the printer 1 in accordance with a command from the host computer 10 is also provided. The recording heads, the UV lamps, and each of the device parts in the sheet conveyance system are controlled by the printer control unit 200. The details of the manner in which the printer control unit 200 controls each of the device parts are as follows.

The printer control unit 200 controls the ink ejection timing of each of the recording heads 51 for forming the color image, in accordance with the conveyance of the sheet S. More specifically, the control of the ink ejection timing is executed on the basis of an output (detection value) from a drum encoder E30 for detecting the rotational position of the platen drum 30, the drum encoder E30 being mounted onto a rotating shaft of the platen drum 30. Namely, because the platen drum 30 rotates reciprocatingly in association with the conveyance of the sheet S, the conveyance position of the sheet S can be ascertained when the output of the drum encoder E30 for detecting the rotational position of the platen drum 30 is referenced. In view thereof, the printer control unit 200 generates a pts (print timing signal) signal from the output of the drum encoder E30 and controls the ink ejection timing of each of recording heads 51 on the basis of the pts signal, whereby the ink having been ejected by each of the recording heads 51 is impacted onto a target position on the sheet S that is being conveyed, thus forming the color image.

The timing whereby the recording head 52 ejects the transparent ink, too, is controlled by the printer control unit 200 in a similar fashion on the basis of the output of the drum encoder E30. This makes it possible for the transparent ink to be accurately ejected onto the color image having been formed by the plurality of recording heads 51. The irradiation light intensity and timing of the turning on and off of the UV lamps 61, 62, 63 are also controlled by the printer control unit 200.

The movements of the recording heads 51, 52 as have been illustrated in FIG. 2 are also controlled by the printer control unit 200. More specifically, the printer control unit 200 controls the movements of the recording heads 51, 52 by operating a head movement mechanism 53, which is a mechanical mechanism for moving the recording heads 51, 52. The head movement mechanism 53 moves each of the recording heads 51, 52 between the print position P1 and the retracted position P2, and selectively positions same at either one of the positions. The head movement mechanism 53 can either move all of the recording heads 51, 52 together, or can move each of the recording heads 51, 52 in an independent manner.

The printer control unit 200 also governs a function for controlling the conveyance of the sheet S, as described in detail with reference to FIG. 1. Namely, among the members constituting the sheet conveyance system, a motor is respectively connected to the supply spindle 20, the front drive roller 31, the rear drive roller 32, and the take-up spindle 40. The printer control unit 200 controls the speed and torque of each of the motors while causing the motors to rotate, and thus controls the conveyance of the sheet S. The details of this control of the conveyance of the sheet S are as follows.

The printer control unit 200 causes a supply motor M20 for driving the supply spindle 20 to rotate, and feeds the sheet S from the supply spindle 20 to the front drive roller 31. The printer control unit 200 herein controls the torque of the supply motor M20 to adjust the tension (supply tension Ta) from the supply spindle 20 to the front drive roller 31. Namely, a tension sensor S21 for detecting the supply tension Ta is mounted onto the driven roller 21 arranged between the supply spindle 20 and the front drive roller 31. The tension sensor S21 can be constituted of, for example, a load cell for detecting the force received from the sheet S. The printer control unit 200 carries out a feedback control of the torque of the supply motor M20 on the basis of a detection result from the tension sensor S21, and thus adjusts the supply tension Ta of the sheet S.

The printer control unit 200 herein carries out the supply of the sheet S while also adjusting the position of the sheet S, in the width direction (the direction orthogonal to the paper in FIG. 1), being fed out from the supply spindle 20 to the front drive roller 31. Namely, a steering unit 7 for respectively displacing the supply spindle 20 and the driven roller 21 in the axial direction (in other words, the width direction of the sheet S) is provided to the printer 1. An edge sensor Se for detecting an edge of the sheet S in the width direction is arranged between the drive roller 21 and the front drive roller 31. The edge sensor Se can be constituted of a distance sensor such as, for example, an ultrasonic sensor. The printer control unit 200 also carries out feedback control of the steering unit 7 on the basis of a detection result from the edge sensor Se, and thus adjusts the position of the sheet S in the width direction. The position of the sheet S in the width direction is thereby suitably adapted, and meandering or other instances of poor conveyance of the sheet S is thereby suppressed.

The printer control unit 200 also rotates a front drive motor M31 for driving the front drive roller 31, and a rear drive motor M32 for driving the rear drive roller 32. The sheet S having been supplied from the supply unit 2 is thereby passed through the process unit 3. Herein, speed control is executed for the front drive motor M31, whereas torque control is executed for the rear drive motor M32. In other words, the printer control unit 200 adjusts the rotational speed of the front drive motor M31 to a constant speed, on the basis of an encoder output from the front drive motor M31. The sheet S is thereby conveyed at a constant speed by the front drive roller 31.

On the other hand, the printer control unit 200 controls the torque of the rear drive motor M32 and thus adjusts the tension (process tension Tb) of the sheet S from the front drive roller 31 to the rear drive roller 32. Namely, a tension sensor S34 for detecting the process tension Tb is mounted onto the drive roller 34 arranged between the platen drum 30 and the rear drive roller 32. This tension sensor S34 can be constituted, for example, of a load cell for detecting the force received from the sheet S. The printer control unit 200 also carries out feedback control of the torque of the rear drive motor M32 on the basis of a detection result from the tension sensor S34, and thus adjusts the process tension Tb of the sheet S.

The printer control unit 200 causes a take-up motor M40 for driving the take-up spindle 40 to rotate, and the sheet S conveyed by the rear drive roller 32 is taken up around the take-up spindle 40. Herein, the printer control unit 200 controls the torque of the take-up motor M40 and thus adjusts the tension (take-up tension Tc) of the sheet S from the rear drive roller 32 to the take-up spindle 40. Namely, a tension sensor S41 for detecting the take-up tension Tc is mounted onto the drive roller 41 arranged between the rear drive roller 32 and the take-up spindle 40. This tension sensor S41 can be constituted, for example, of a load cell for detecting the force received from the sheet S. The printer control unit 200 carries out a feedback control of the torque of the take-up motor M40 on the basis of a detection result from the tension sensor S41, and thus adjusts the take-up tension Tc of the sheet S.

Figure 4:
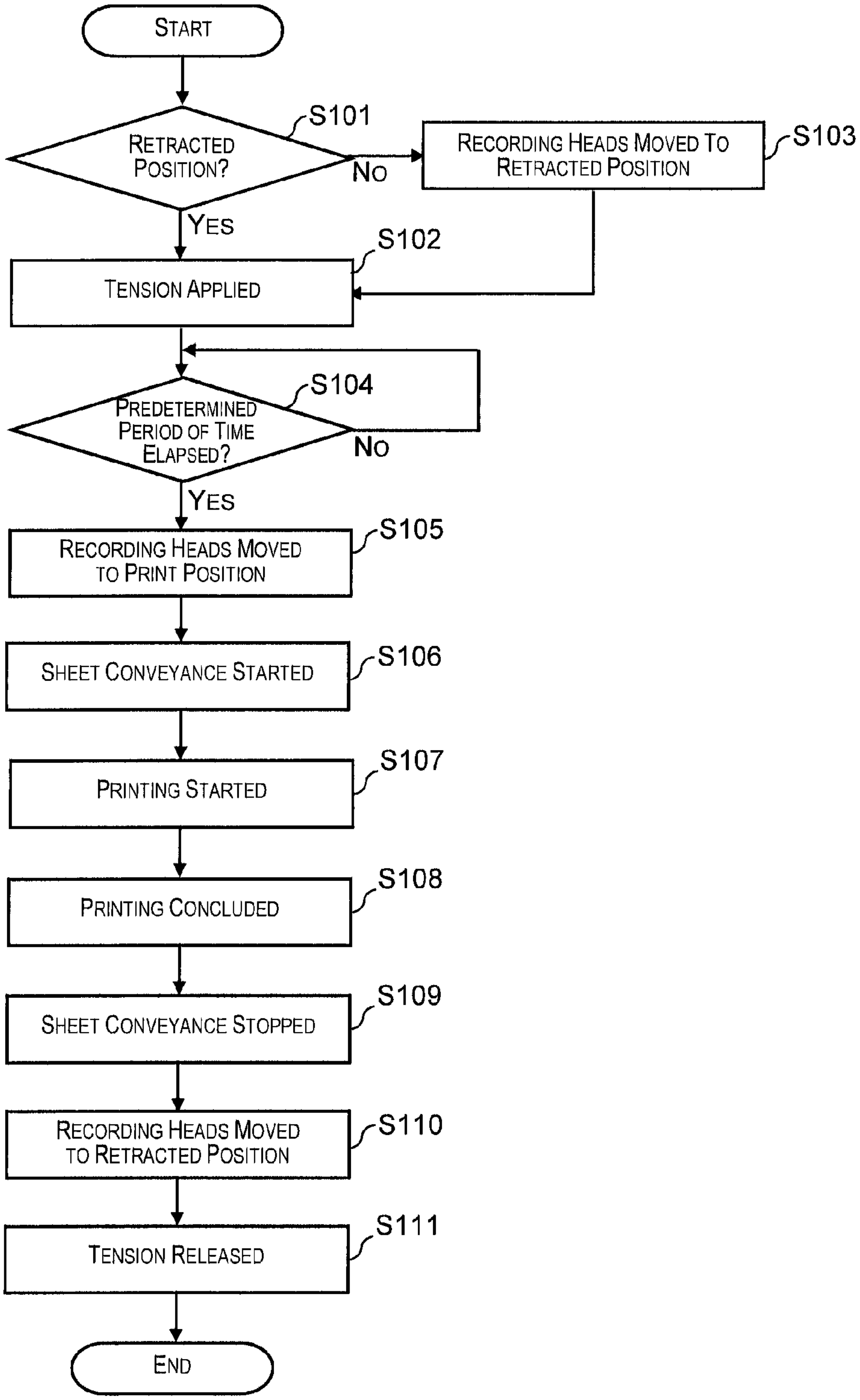
FIG. 4 is a flow chart illustrating an operation executed by a printer of a first embodiment.
Figure 5:
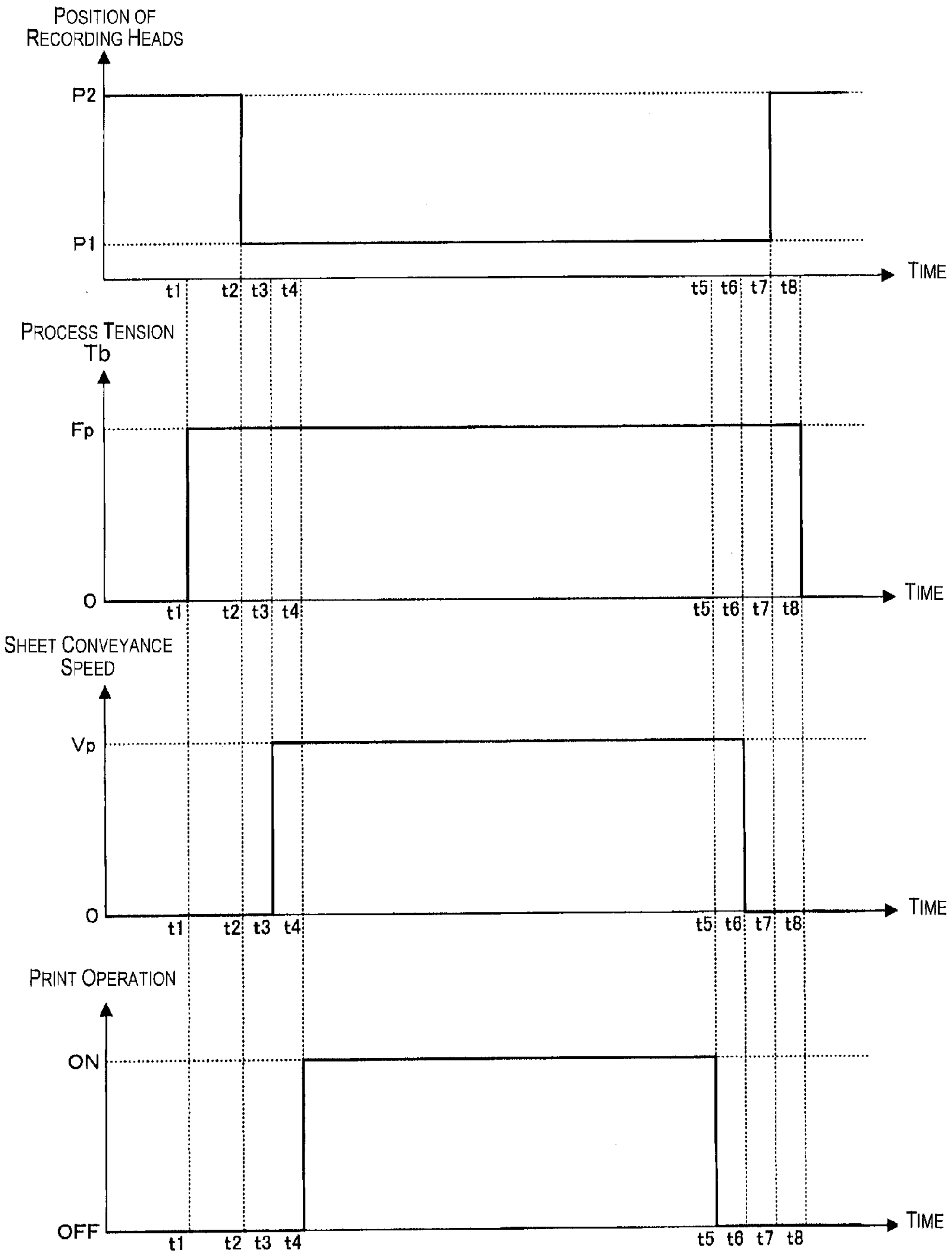
FIG. 5 is a timing chart illustrating an operation executed by the printer of the first embodiment.

The foregoing is a summary of the electrical configuration for controlling the printer 1. Next, the description shall relate to an operation executed by the printer 1 of the first embodiment. FIG. 4 is a flow chart illustrating a summary of an operation executed by the printer as in the first embodiment. FIG. 5 is a flow chart illustrating a summary of an operation executed by the printer as in the first embodiment. A command indicating that printing (image recording) is to be initiated is received from the host computer 10, whereupon the printer control unit 200 executes the flow chart in FIG. 4. The flow chart is read out from the program 124, and is stored in advance in a memory inside the printer control unit 200 or elsewhere.

In a step S101, the question of whether or not each of the recording heads 51, 52 is at the retracted position P2 is confirmed. In a case where each of the recording heads 51, 52 is at the retracted position P2 (a case of "YES" in the step S101), the flow proceeds without alteration to a step S102. On the other hand, in a case where each of the recording heads 51, 52 is not at the retracted position P2 (a case of "NO" in the step S101), then the flow proceeds to a step S103, in which each of the recording heads 51, 52 is moved to the retracted position P2, whereafter the flow then proceeds to the step S102. FIG. 5 illustrates an operation in the case where each of the recording heads 51, 52 is at the retracted position P2.

In the step S102, tension is imparted to the sheet S (a time t1). The process tension Tb of the sheet S at the process unit 3 is thereby elevated from zero to a print tension Fp (>0). The supply tension Ta and the take-up tension Tc at the supply unit 2 and the take-up unit 4, respectively, are also respectively set to appropriate values. Herein, the tensions Ta, Tb, Tc need not all be identical, and can each respectively be set independently of each other.

Next, in a step S104, a predetermined period of time (=t2−t1) is confirmed to have elapsed since the application of the tension, whereupon in a step S105, the recording heads 51, 52 are moved from the retracted position P2 to the print position P1 (a time t2). Herein, the reason for confirming the elapsing of the predetermined period of time in the step S104 is so that the recording heads 51, 52 will be moved to the print position P1 once there has been a wait for the process tension Tb to stably be at the print tension Fp. The period of the time required in order for the process tension Tb to stably be at the print tension Fp is found in advance by experimentation or the like, and is stored in the memory of the printer control unit 200.

In a step S106, the conveyance of the sheet S is started (a time t3). The conveyance speed of the sheet S is thereby accelerated from zero to a print speed Vp. When the conveyance of the sheet S is started in this manner, the printing by the recording heads 51, 52 is started in a step S107 (a time t4). Each of the recording heads 51, 52, which are positioned at the print position P1, thereby prints an image onto the sheet S being conveyed at the print speed Vp. Then, when the printing of the image is concluded in a step S108 (a time t5), the conveyance of the sheet S is stopped in a step S109 (a time t6). The conveyance speed of the sheet S is thereby decelerated from the print speed Vp to zero.

In a subsequent step S110, each of the recording heads 51, 52 is moved from the print position P1 to the retracted position P2 (a time t7). When the movement of each of the recording heads 51, 52 to the retracted position P2 is completed in this manner, then the tension of the sheet S is released in a step S111 (a time t8). The process tension Tb of the sheet S at the process unit 3 is thereby reduced from the print tension Fb to zero. The supply tension Ta and the take-up tension Tc at the supply unit 2 and the take-up unit 4 are also reduced to zero in a similar fashion.

As has been described above, in the present embodiment, the recording heads 51, 52 having been positioned at the print position P1 print onto the sheet S while facing the platen drum 30, with the sheet S interposed therebetween. The recording heads 51, 52 can be positioned at the print position P1 for executing printing, as well as at the retracted position P2 further away from the platen drum 30 than the print position P1. When the tension of the sheet S is to be altered, as in the steps S102 and S111 of FIG. 4, then the recording heads 51, 52 are positioned at the retracted position P2. That is, in the present embodiment, when printing is to be executed, then the recording heads 51, 52 are positioned at the print position P1, which is in comparatively greater proximity to the platen drum 30, and thus the recording heads 51, 52 are in close proximity to the sheet S, whereas when the tension of the sheet S is to be altered, then the recording heads 51, 52 are positioned at the retracted position P2, which is comparatively farther away from the platen drum 30, and thus the recording heads 51, 52 are separated away from the sheet S. In this manner, printing in a state where the recording heads 51, 52 have been brought into close proximity to the sheet S can be implemented, and also contact between the recording heads 51, 52 and the sheet S, which floats upward in association with the alteration of the tension, can be suppressed.

More specifically, in the present embodiment, the recording heads 51, 52 are positioned at the retracted position P2 and then, in this state, the tension of the sheet S is elevated to the print tension Fp; thereafter, the recording heads 51, 52 are moved to the print position P1 and printing is executed. In the configuration of such description, the tension of the sheet S can be elevated to the print tension Fp while contact between the sheet S and the recording heads 51, 52 is suppressed, and also subsequent printing can be executed appropriately in a state where the recording heads 51, 52 have been brought into close proximity with the sheet S.

In the present embodiment, when the printing by the recording heads 51, 52 is concluded, the recording heads 51, 52 are moved to the retracted position P2, and thereafter the process tension Tb of the sheet S is reduced from the print tension Fp. In the configuration of such description, printing can be executed appropriately in the state where the recording heads 51, 52 have been brought into close proximity to the sheet S, and also the subsequent reduction of the tension of the sheet S can be implemented while contact between the sheet S and the recording heads 51, 52 is suppressed.

Also, in the present embodiment, the sheet S is wound around and supported by the cylindrical platen drum 30. In comparison to a configuration in which the sheet S is supported on a flat surface, the configuration of such description is advantageous in that the platen drum 30, which is a support member, can be closely contacted with the sheet S and upward floating of the sheet S can be minimized, and also in that the occurrence of contact between the sheet and the recording heads 51, 52 can suppressed.

Second Embodiment

It has been noted that in the embodiment described above, the conveyance speed of the sheet S is changed at times such as when the conveyance of the sheet S is started or stopped. With the configuration of such description, in some cases the sheet S will float up away from the platen drum 30, in association with the change in the conveyance speed of the sheet S. Then, in such cases, the sheet S can presumably come into contact with the recording heads 51, 52 which are in close proximity thereto, and the sheet S can be thereby sullied or the recording heads 51, 52 can be thereby damaged.

In particular, the tension of the sheet S sometimes undergoes considerable temporary fluctuations due to the fluctuations in the motor load occurring immediately after the change in the sheet conveyance speed. In such a case, when the sheet is not very rigid, then the sheet S can presumably float upward away from the platen drum 3 in association with the tension fluctuation, and come into contact with the recording heads 51, 52. In view whereof, in the second embodiment, the recording heads 51, 52 are positioned at the retracted position P2 in advance of whenever the conveyance speed of the sheet S is to be changed.

What follows is a more detailed description of the present second embodiment. The description below shall center on the portions of difference from the embodiment described above, and a description of like portions shall be omitted as appropriate. However, it shall be readily understood that the second embodiment, too, being equipped with a configuration akin to that of the embodiment described above, thereby gives rise to an effect similar to that of the embodiment described above.

Figure 6:
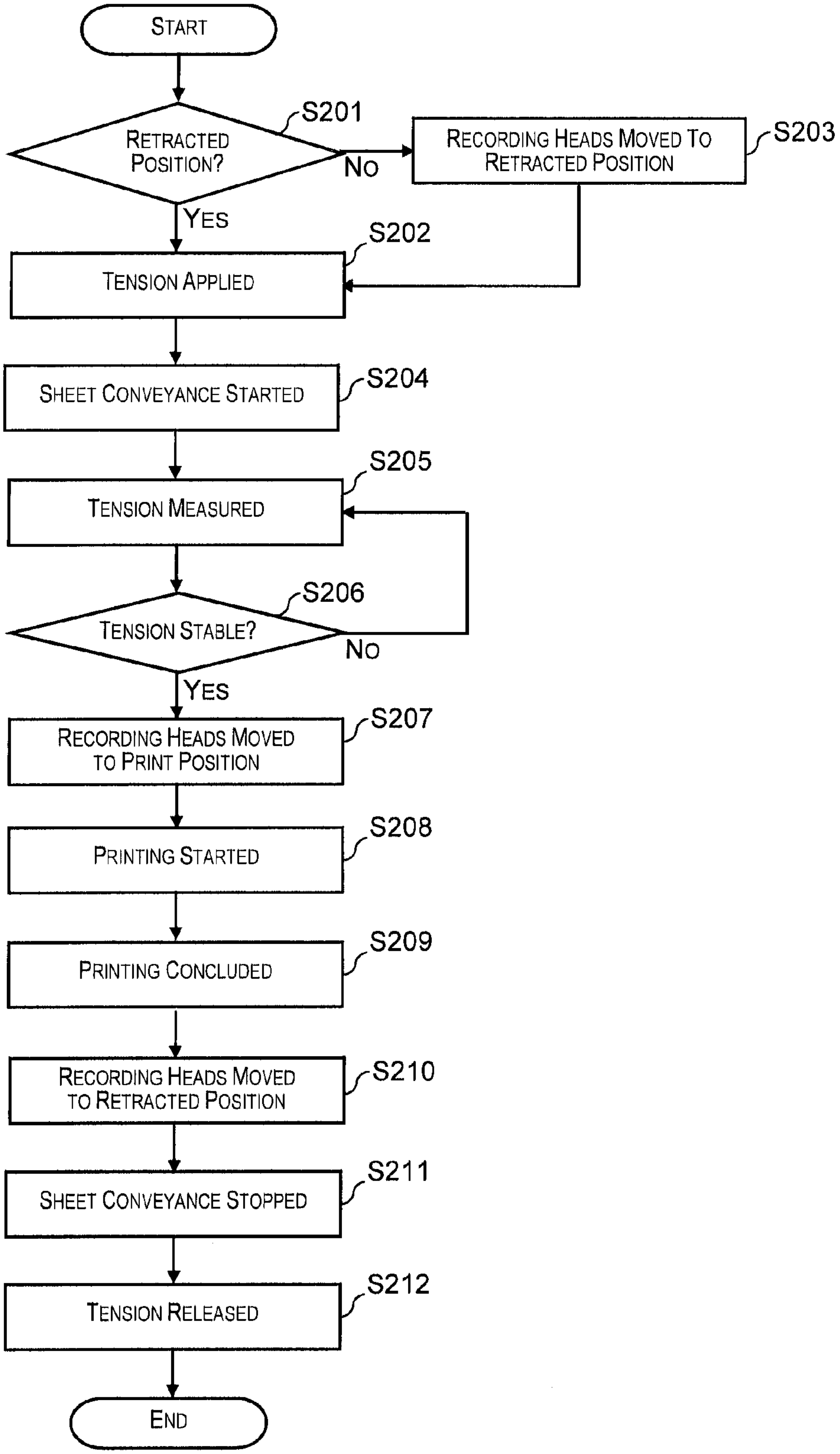
FIG. 6 is a flow chart illustrating an operation executed by a printer of a second embodiment.
Figure 7:
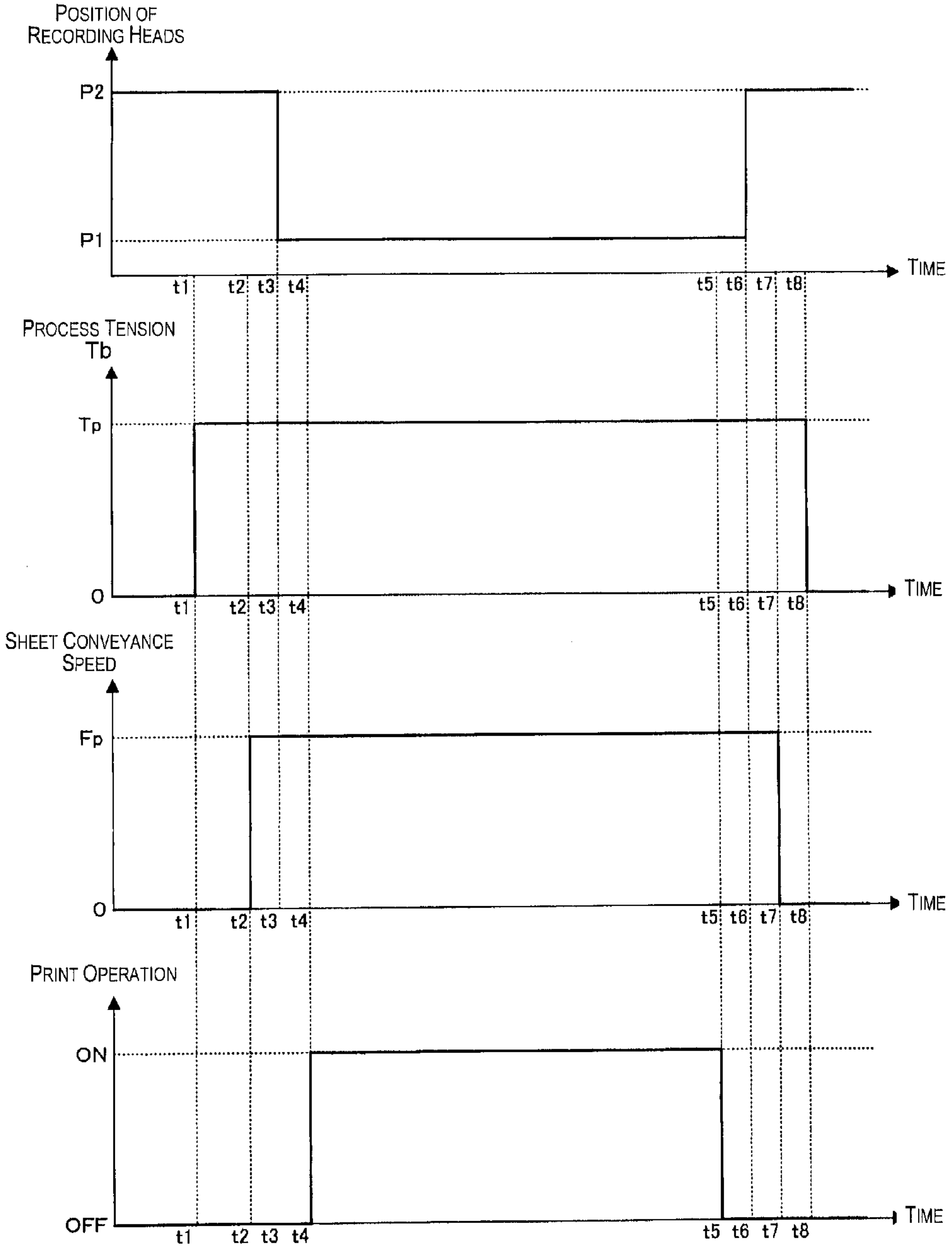
FIG. 7 is a timing chart illustrating an operation executed by the printer of the second embodiment.

FIG. 6 is a flow chart illustrating a summary of an operation executed by a printer as in the second embodiment. FIG. 7 is a timing chart illustrating a summary of an operation executed by the printer as in the second embodiment. When a command indicating that image recording is to be started is received from the host computer 10, the printer control unit 200 executes the flow chart in FIG. 6. The flow chart is read out from the program 124, and is stored in advance in a memory inside the printer control unit 200 or elsewhere.

In a step S201, the question of whether or not each of the recording heads 51, 52 is at the retracted position P2 is confirmed. In a case where each of the recording heads 51, 52 is at the retracted position P2 (a case of "YES" in the step S201), the flow proceeds without alteration to a step S202. On the other hand, in a case where each of the recording heads 51, 52 is not at the retracted position P2 (a case of "NO" in the step S201), then the flow proceeds to a step S203, in which each of the recording heads 51, 52 is moved to the retracted position P2, whereafter the flow then proceeds to the step S202. FIG. 7 illustrates an operation in the case where each of the recording heads 51, 52 is at the retracted position P2.

In the step S202, tension is imparted to the sheet S (a time t1). The process tension Tb of the sheet S at the process unit 3 is thereby elevated from zero to the print tension Fp (>0). The supply tension Ta and the take-up tension Tc at the supply unit 2 and the take-up unit 4, respectively, are also respectively set to appropriate values. Herein, the tensions Ta, Tb, Tc need not all be identical, and can each respectively be set independently of each other.

Next, in a step S204, the conveyance of the sheet S is started (a time t2). The conveyance speed of the sheet S is thereby accelerated from zero to the print speed Vp. When the sheet conveyance is started in this manner, the process tension Tb of the sheet S is measured by the tension sensor S34 (a step S205), and the question of whether or not the process tension Tb has stabilized is determined from this measurement result (a step S206). More specifically, the process tension Tb can be determined to have stabilized once, for example, the time average of the measurement value for the process tension Tb has fallen within a predetermined range.

The steps S205, S206 are repeated until the stabilization of the process tension Tb is confirmed. Then, when the stabilization of the process tension Tb is confirmed (a case of "YES" in the step S206), then the flow proceeds to a step S207, in which the recording heads 51, 52 are moved from the retracted position P2 to the print position P1 (a time t3). The printing by the recording heads 51, 52 is then started in a step S208 (a time t4). Each of the recording heads 51, 52, which are positioned at the print position P1, thereby prints an image onto the sheet S being conveyed at the print speed Vp.

When the printing of the image in step S208 is concluded (a time t5), then each of the recording heads 51, 52 is moved in the step S110 from the print position P1 to the retracted position P2 (a time t6). When the movement of each of the recording heads 51, 52 is completed in this manner, then the conveyance of the sheet S is stopped in the step S109 (a time t7). The conveyance speed of the sheet S is thereby decelerated from the print speed Vp to zero. When the sheet S is stopped in this manner, then the tension of the sheet S is released in a step S212 (a time t8). The process tension Tb of the sheet S at the process unit 3 is thereby reduced from the print tension Fp to zero. The supply tension Ta and the take-up tension Tc at the supply unit 2 and the take-up unit 4 are also reduced to zero in a similar fashion.

As has been described above, in the present embodiment, too, when printing is to be executed, then the recording heads 51, 52 are positioned at the print position P1, which is in comparatively greater proximity to the platen drum 30, and thus the recording heads 51, 52 are in close proximity to the sheet S, whereas when the tension of the sheet S is to be altered, then the recording heads 51, 52 are positioned at the retracted position P2, which is comparatively farther away from the platen drum 30, and thus the recording heads 51, 52 are separated away from the sheet S. In this manner, printing in a state where the recording heads 51, 52 have been brought into close proximity to the sheet S can be implemented, and also contact between the recording heads 51, 52 and the sheet S, which floats upward in association with the alteration of the tension, can be suppressed.

In the present embodiment, the recording heads 51, 52 are positioned at the retracted position whenever the conveyance speed of the sheet S is to be changed. As such, it becomes possible to change the conveyance speed of the sheet S while also suppressing contact between the sheet S and the recording heads 51, 52, even though the sheet S can float upward due to the change in the conveyance speed of the sheet S.

In particular, as described above, the fact that the tension of the sheet S fluctuates when the conveyance speed of the sheet S is changed is in some cases one cause for upward floating of the sheet S. By contrast, in the present embodiment, the fact that the tension of the sheet S has stabilized after the conveyance speed has been changed is confirmed by the detection result from the tension sensor S34, and thereafter the recording heads 51, 52 are moved to the print position P1 and printing is then executed. As such, the conveyance speed of the sheet S can be changed while contact between the sheet S and the recording heads 51, 52 is suppressed, and also subsequent printing can be executed appropriately in a state where the recording heads 51, 52 have been brought into close proximity with the sheet S.

In the present embodiment, when the printing by the recording heads 51, 52 is concluded, the recording heads 51, 52 are moved to the retracted position P2, and thereafter the conveyance speed of the sheet S is reduced. In the configuration of such description, printing can be executed appropriately in the state where the recording heads 51, 52 have been brought into close proximity to the sheet S, and also the subsequent reduction of the conveyance speed of the sheet S can be implemented while contact between the sheet S and the recording heads 51, 52 is suppressed.

Third Embodiment

As described above, the sheet S sometimes floats upward away from the platen drum 30 in association with a change in the conveyance speed of the sheet S. The causes of the upward floating of the sheet S include not only a fluctuation in the tension of the sheet S, described above, but also the fact that the conveyance speed of the sheet S, after being changed, will be temporarily unstable. In particular, in the above-described configurations in which the platen drum 30 is rotated so as to be driven by the sheet S, slipping is more prone to occur between the sheet S and the platen drum 30 and the conveyance speed of the sheet S is more prone to become unstable when the coefficient of friction of the sheet S is small. In such a case, there is a possibility that the sheet S, the conveyance speed of which has become unstable, can float upward and come into contact with the recording heads 51, 52. In view whereof, in the present third embodiment, the recording heads 51, 52 are moved to the print positions P1 to execute printing once the conveyance speed of the sheet S, after having been changed, has become stable.

What follows is a more detailed description of the present third embodiment. The description below shall center on the portions of difference from the embodiments described above, and a description of like portions shall be omitted as appropriate. It shall be readily understood that the third embodiment, too, being equipped with a configuration akin to that of the embodiments described above, thereby gives rise to an effect similar to that of the embodiments described above.

Figure 8:
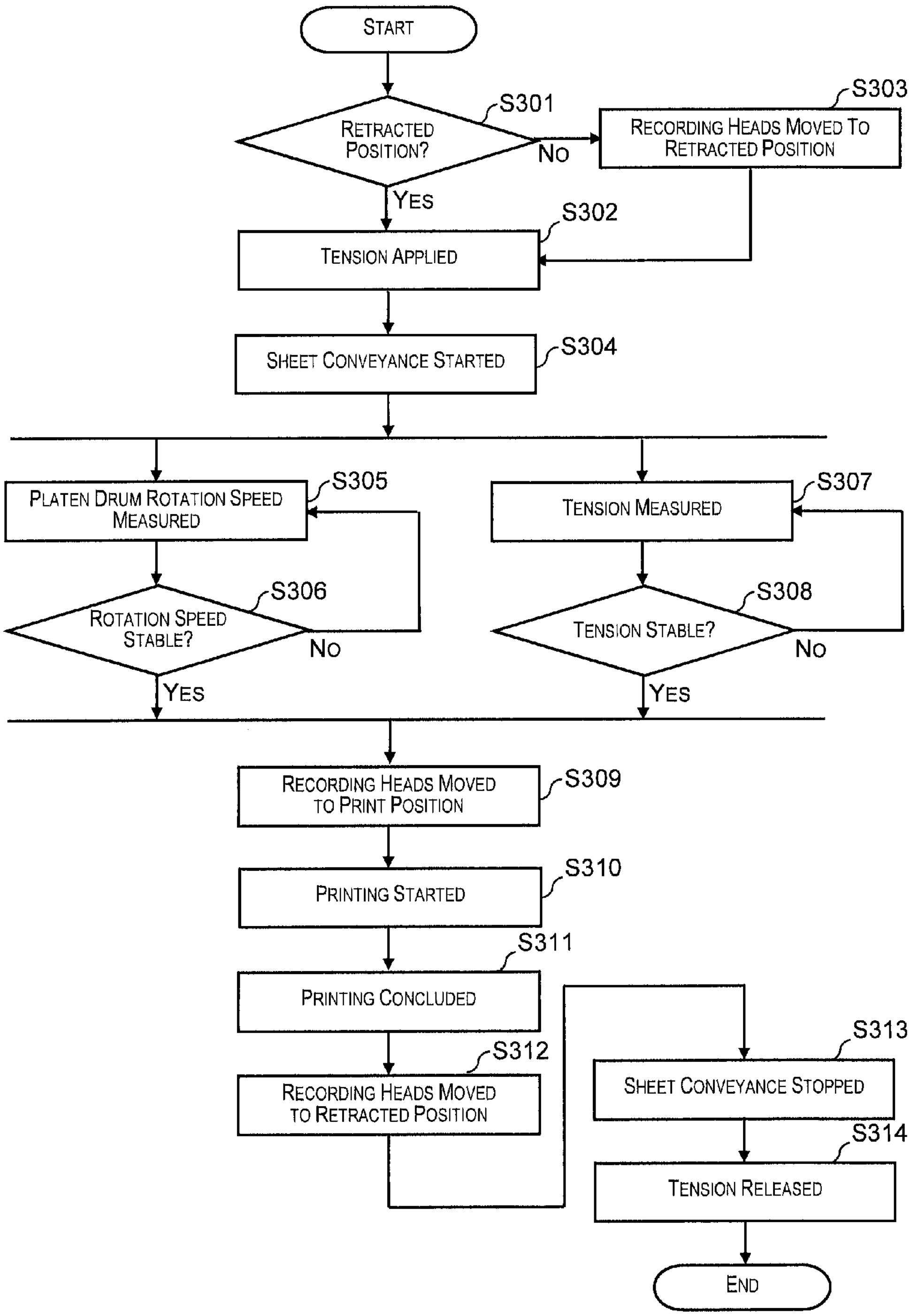
FIG. 8 is a flow chart illustrating an operation executed by a printer of a third embodiment.

FIG. 8 is a flow chart illustrating a summary of an operation executed by a printer as in the third embodiment. When a command indicating that image recording is to be started is received from the host computer 10, the printer control unit 200 executes the flow chart in FIG. 8. The flow chart is read out from the program 124, and is stored in advance in a memory inside the printer control unit 200 or elsewhere.

The flow chart of FIG. 8 as in the third embodiment differs from the flow chart of FIG. 6 as in the second embodiment with respect to the content of the steps between the steps S204 to S207, but the content of other steps is alike. Namely, in the third embodiment, when the conveyance of the sheet is started in a step S304, the printer control unit 200 measures the process tension of the sheet S using the tension sensor S34 (a step S307), and also measures the rotational speed of the platen drum 30 using the drum encoder E30 (a step S305).

The question of whether or not the process tension Tb has stabilized is determined on the basis of the measurement result from S307 (a step S308). The technique for determination is similar to that described in the second embodiment. The steps S307, S308 are repeated until the stabilization of the process tension Tb is confirmed. When the stabilization of the process tension Tb is confirmed (a case of "YES" in the step S308), then a conveyance tension flag is lifted.

In parallel therewith, the question of whether or not the rotational speed of the platen drum 30 has stabilized is determined on the basis of the measurement result from the step S305 (a step S306). More specifically, the rotational speed of the platen drum 30 can be determined to have stabilized once, for example, the time average of the measurement value for the rotational speed of the platen drum 30 has fallen within a predetermined range. The steps S305, S306 are repeated until the stabilization of the rotational speed of the platen drum 30 is confirmed. When the stabilization of the rotational speed of the platen drum 30 is confirmed (a case of "YES" in the step S306), then the conveyance speed of the sheet S, whereby the platen drum 30 is driven, is determined to also have stabilized, and a conveyance speed flag is lifted. In other words, herein, the conveyance speed of the sheet S, after having been changed, is determined to have stabilized on the basis of the rotational speed of the platen drum 30, which is driven by the sheet S.

When the conveyance tension flag and the conveyance speed flag have both been lifted and the stabilization of both the tension and the conveyance speed of the sheet S has been confirmed, then the recording heads 51, 52 are moved from the retracted position P2 to the print position P1 (a step S309). The following steps are then executed in a sequential manner. It should also be noted that the question of which of the two flags will be lifted earlier is dependent on the rigidity and the coefficient of friction of the sheet S. Namely, the tension of the sheet S stabilizes earlier when the rigidity of the sheet S is higher, and the conveyance speed of the sheet S stabilizes earlier when the coefficient of friction of the sheet S is greater. As such, in a case where, for example, printing is to be carried out on a sheet S that has high rigidity and a low coefficient of friction, then the tension of the sheet S will stabilize earlier, and thus the conveyance tension flag is lifted first. On the other hand, in a case where printing is to be carried out on a sheet S that has low rigidity and a high coefficient of friction, then the conveyance speed of the sheet S will stabilize earlier, and thus the conveyance speed flag is lifted first.

As has been described above, in the present embodiment, too, the recording heads 51, 52 are positioned at the retracted position P2 when the conveyance speed of the sheet S is to be changed. As such, it becomes possible to change the conveyance speed of the sheet S while also suppressing contact between the sheet S and the recording heads 51, 52, even though the sheet S can float upward due to the change in the conveyance speed of the sheet S.

In particular, as described above, the fact that the tension of the sheet S fluctuates when the conveyance speed of the sheet S is changed is in some cases one cause for upward floating of the sheet S. By contrast, in the present embodiment, the fact that the tension of the sheet S has stabilized after the conveyance speed has been changed is confirmed by the detection result from the tension sensor S34, and thereafter the recording heads 51, 52 are moved to the print position P1 and printing is then executed. As such, the conveyance speed of the sheet S can be changed while contact between the sheet S and the recording heads 51, 52 is suppressed, and also subsequent printing can be executed appropriately in a state where the recording heads 51, 52 have been brought into close proximity with the sheet S.

Also, the fact that the conveyance speed of the sheet S is temporarily unstable after the conveyance speed of the sheet S has been changed has also in some cases been a cause for the upward floating of the sheet S. By contrast, in the present embodiment, the recording heads 51, 52 are positioned at the retracted position P2 while the conveyance speed is being changed, and the recording heads 51, 52 are moved to the print position P1 to execute printing once the conveyance speed of the sheet S has stabilized after the conveyance speed has been changed. As such, the sheet S can be accelerated until a predetermined conveyance speed while contact between the sheet S and the recording heads 51, 52 is also being suppressed; also, the subsequent printing can be appropriately executed in the state where the recording heads 51, 52 have been brought into close proximity with the sheet S.

In particular, in the present embodiment, the recording heads 51, 52 are moved to the print position P1 to execute printing after it has been confirmed, by the detection result from the drum encoder E30, that the conveyance speed of the sheet S has stabilized. With the configuration of such description, the occurrence of contact between the sheet S and the recording heads 51, 52 can be even more reliably suppressed.

Other

In the embodiments described above, as per the foregoing, the printer 1 is equivalent to the "image recording device" of the present invention; the sheet S is equivalent to the "print medium" of the present invention; the platen drum 30 is equivalent to the "support member" or to the "support drum" of the present invention; the recording heads 51, 52 are equivalent to the "print head" of the present invention; the print position P1 is equivalent to the "print position" of the present invention; the retracted position P2 is equivalent to the "retracted position" of the present invention; the rear drive roller 32 is equivalent to the "tension adjustment unit" of the present invention; the print tension Fp is equivalent to the "print tension" of the present invention; and the printer control unit 200 is equivalent to the "control unit" of the present invention. Also, each of the various rollers and shafts arranged along the conveyance pathway Pc are equivalent to the "conveyor unit" of the present invention; the tension sensor S34 is equivalent to the "tension detection unit" of the present invention; and the drum encoder E30 is equivalent to the "rotation detection unit" of the present invention. The steps S107 to S108, S208 to S209, and S310 to S311 are equivalent to the "print step" of the present invention, and the steps S102, S111, S202, S212, S302, S314 are equivalent to the "tension alteration step" of the present invention.

The invention is not to be limited to the embodiments described above; rather, a variety of different modifications can be added to what has been described above, provided that there is no departure from the spirit of the present invention. For example, in the embodiments described above, the recording heads 51, 52 were configured so as to be movable in the radial direction of the platen drum 30, but the direction in which the recording heads 51, 52 are moved is not limited thereto, and can be modified as appropriate.

Also, in the embodiments described above, the sheet S was supported by the drum-shaped platen drum 30. However, the shape of the member for supporting the sheet S is not limited thereto, and can be, for example, a flat shape.

With respect to the flow charts described above, as well, the order of each of the steps can be modified as appropriate, or some steps can be omitted. For example, in a case where the configuration at the start of the flow chart is such that the recording heads 51, 52 will always have retracted to the retracted position P2, then the steps S101 to S103, S201 to S203, S301 to S303 can be omitted.

In the embodiments described above, the examples illustrated were of a case where the conveyance speed of the sheet S is accelerated from zero and thereafter printing is carried out. However, operation could also conceivably be such that the print mode is altered in the midst of printing and the conveyance speed of the sheet S is switched from a higher speed to a lower speed; at such a time, the printing would be carried out after the conveyance speed of the sheet S has been reduced. Then, in such a case, the configuration can be such that when the sheet S is decelerated, the recording heads will have been positioned at the retracted position P2, the recording heads 51, 52 being moved to the print position P1 once the deceleration of the sheet S.

In the third embodiment described above, the recording heads 51, 52 are moved to the print position P1 after the confirmation both of the stabilization of the process tension Tb of the sheet S and of the stabilization of the conveyance speed of the sheet S. However, the configuration can also be such that only the stabilization of the conveyance speed of the sheet S is confirmed, and then the recording heads 51, 52 are moved to the print position P1.

In the embodiments described above, all of the recording heads 51, 52 were configured so as to be movable between the print position P1 and the retracted position P2, but it would also be possible for only some of the recording heads 51, 52 to be configured thus. For example, there are some conceivable cases where print accuracy required for the recording head 52 for ejecting the transparent UV ink is not as great as the print accuracy required for the other recording heads 51. In such a case, the recording head 52 need not necessarily be brought into close proximity to the sheet S during printing. In view whereof, it would also be possible to adopt a configuration such that the recording head 52 is fixedly provided to a position adequate far away from the outer peripheral surface of the platen drum 30.

Also, in the embodiments described above, the speed control was executed with respect to the front drive roller 31, and the torque control was executed with respect to the rear drive roller 32. However, the speed control can also be executed with respect to the rear drive roller 32, the conveyance speed of the sheet S being determined from the rear drive roller 32, and the torque control can be executed with respect to the front drive roller 31, the tension Tb of the sheet S being adjusted by the front drive roller 31. The configuration can also herein be such that the sensor for detecting the tension Tb of the sheet S is provided to the driven roller 33.

What is claimed is:

1. An image recording device, comprising:

a support member configured and arranged to support a sheet-shaped print medium;

a print head configured and arranged to move between a print position, at which printing of an image onto the print medium is executed, and a retracted position, at which a tension of the print medium is altered, the retracted position being farther away from the support member than the print position, while also facing the support member, with the print medium interposed therebetween;

a tension adjustment unit configured and arranged to adjust the tension of the print medium being supported by the support member; and a control unit operatively coupled to the print head and the tension adjustment unit, the control unit being configured to control the print head to move to the retracted position and to control the tension adjustment unit to alter the tension of the print medium while the print head is positioned at the retracted position, and the control unit being further configured to control the print head to move to the print position and to execute printing by the print head while the print head is positioned at the print position with the tension of the print medium being adjusted to a print tension by the tension adjustment unit.

2. The image recording device as set forth in claim 1, wherein:

the control unit elevates the tension of the print medium to the print tension in the state where the print head has been positioned at the retracted position, and thereafter moves the print head to the print position to execute printing.

3. The image recording device as set forth in claim 1, wherein:

when the printing by the print head is concluded, the control unit moves the print head to the retracted position and thereafter reduces the tension of the print medium from the print tension.

4. The image recording device as set forth in claim 1, further comprising:

a conveyor unit for conveying the print medium, wherein:

the control unit executes the printing on the print medium being conveyed by the conveyor unit.

5. The image recording device as set forth in claim 4, wherein:

the control unit positions the print head at the retracted position whenever the conveyor unit is to change the conveyance speed of the print medium.

6. The image recording device as set forth in claim 5, further comprising:

a tension detection unit for detecting the tension of the print medium, wherein:

the control unit confirms, by a detection result from the tension detection unit, that the tension of the print medium after the conveyance speed has been changed has stabilized, and thereafter moves the print head to the print position to execute printing.

7. The image recording device as set forth in claim 6, wherein:

when the printing by the print head is concluded, the control unit moves the print head to the retracted position, and thereafter causes the conveyor unit to reduce the conveyance speed of the print medium.

8. The image recording device as set forth in claim 5, wherein:

the control unit positions the print head at the retracted position while the conveyance speed is being changed, and also moves the print head to the print position to execute printing once the conveyance speed of the print medium, after the conveyance speed has been changed, has stabilized.

9. The image recording device as set forth in claim 8, wherein:

the support member is a cylindrical-shaped support drum for supporting the print medium while the print medium is wound therearound, and rotates while being driven by the print medium being conveyed by the conveyor unit.

10. The image recording device as set forth in claim 9, further comprising:

a rotation detection unit for detecting the rotation of the support drum, wherein:

the control unit confirms, by a detection result from the rotation detection unit, that the conveyance speed of the print medium has stabilized, and thereafter moves the print head to the print position to execute printing.

11. An image recording method comprising:

orienting a print head, having been positioned at a print position, so as to face a support member, with a sheet-shaped print medium supported by the support member being interposed therebetween, and then causing the print head to execute printing of an image onto the print medium; and altering a tension of the print medium, either before or after the print step, in a state where the print head has been positioned at a retracted position while also facing the support member with the print medium interposed therebetween, at which a tension of the print medium is altered, the retracted position being farther away from the support member than the print position.

* * * * *